(12) United States Patent
Park et al.

(10) Patent No.: US 8,694,057 B2
(45) Date of Patent: Apr. 8, 2014

(54) MOBILE TERMINAL WITH TRANSPARENT CASE

(75) Inventors: Seok Yong Park, Ansan-si (KR); Chang Won Yun, Gwangmyeong-si (KR); Jung Hyeong Ha, Anyang-si (KR); Seung Su Yang, Seoul (KR); Gi Hoon Tho, Seoul (KR); Young Tae Im, Anyang-si (KR); Hyo Sung Park, Seoul (KR); Byung Woon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 12/969,481

(22) Filed: Dec. 15, 2010

(65) Prior Publication Data
US 2011/0165916 A1 Jul. 7, 2011

(30) Foreign Application Priority Data

Jan. 4, 2010 (KR) ........................ 10-2010-0000159

(51) Int. Cl.
*H04B 1/38* (2006.01)
(52) U.S. Cl.
USPC ...................... 455/566; 455/550.1; 455/556.2; 455/562.1; 455/575.1; 455/575.7
(58) Field of Classification Search
USPC ............... 455/73, 556.2, 562.1, 566, 455/575.1–575.9, 550.1–90.3
See application file for complete search history.

(56) References Cited

U.S. PATENT DOCUMENTS

| | | | |
|---|---|---|---|
| 7,646,941 B2 * | 1/2010 | Danielson et al. ............. | 382/313 |
| 7,983,721 B2 | 7/2011 | Ying et al. | |
| 8,188,931 B2 * | 5/2012 | Furutani ....................... | 343/702 |
| 2001/0002865 A1 * | 6/2001 | Lipponen et al. ............. | 359/191 |
| 2004/0145975 A1 * | 7/2004 | Barras et al. .................. | 368/281 |
| 2004/0203493 A1 * | 10/2004 | Carlson ........................ | 455/90.1 |
| 2004/0204125 A1 * | 10/2004 | Messel et al. ................. | 455/566 |
| 2005/0073829 A1 | 4/2005 | Burger et al. | |
| 2007/0287503 A1 * | 12/2007 | Ying et al. .................... | 455/566 |
| 2008/0129531 A1 | 6/2008 | Messel et al. | |
| 2008/0192500 A1 | 8/2008 | Kaito | |
| 2008/0238937 A1 * | 10/2008 | Muraki ......................... | 345/619 |
| 2009/0176534 A1 * | 7/2009 | Lee et al. ...................... | 455/566 |
| 2010/0073242 A1 * | 3/2010 | Vazquez et al. ............... | 343/702 |

FOREIGN PATENT DOCUMENTS

| | | |
|---|---|---|
| CN | 1640101 A | 7/2005 |
| CN | 1961454 A | 5/2007 |
| EP | 1627672 A1 | 2/2006 |
| WO | 2004/032463 A2 | 4/2004 |
| WO | WO 2008/133005 * 11/2008 ................. 455/575.3 |

OTHER PUBLICATIONS

Article "The Mac is Back with a Double-Dose of Glass Phone Style Design" by Yanko Design, dated Nov. 20, 2008.*
Article "Glassy Glassy" by Petit Invention, also dated Nov. 20, 2008.*
Mac Funamizu, "Glassy Glassy," PetitInvention—Better Design for a Better Life, XP-002629797; Nov. 20, 2008, http://petitinvention.wordpress.com/2008/11/20/glassy-glassy.

* cited by examiner

*Primary Examiner* — Ronald Eisner
(74) *Attorney, Agent, or Firm* — Birch, Stewart, Kolasch & Birch, LLP

(57) ABSTRACT

The present invention relates to a mobile terminal, and more particularly, to a mobile terminal which can enlarge a transparent portion region, increase design freedoms, provide transparent mounting regions by forming various electronic components of a transparent material, and produce a variety of light emission pattern in particular scenarios by using the transparent portion region.

14 Claims, 15 Drawing Sheets

MOBILE TERMINAL WITH TRANSPARENT CASE

Pursuant to 35 U.S.C. §119(a), this application claims the benefit of earlier filing date and right of priority to Korean Application No. 10-2010-0000159, filed on Jan. 4, 2010, the contents of which are hereby incorporated by reference herein in their entirety.

TECHNICAL FIELD

The present invention relates to a mobile terminal which can enlarge a transparent portion region and increase design freedoms.

BACKGROUND ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

An antenna is a device for encoding an electric signal into an electric wave or vice versa. In the antenna for the mobile phone, there are an outside mounting type and an inside mounting type.

In a case of the outside mounting type, the antenna is disadvantageous in that the antenna is projected from the mobile terminal, giving inconvenience to a user, and increasing a volume of the mobile terminal due to an inside space the antenna occupies, and in a case of the inside mounting type, even though the antenna can reduce the volume occupied by the antenna relative to the outside mounting type, the inside mounting type is disadvantageous in that the inside mounting type still occupies a not a small volume.

In the meantime, client's needs on the mobile terminal of various designs are becoming higher, particularly, the client's needs on the mobile terminal having a transparent case are increasing.

However, a related art mobile terminal uses a non-transparent case for preventing a speaker, a microphone, an antenna mounted in the case from exposing to an outside of the mobile terminal, failing to satisfy the user's needs.

DISCLOSURE OF INVENTION

Technical Problem

An object of the present invention is to provide a mobile terminal which can enlarge a transparent portion area and increase design freedoms.

Another object of the present invention is to provide a mobile terminal, in which various electronic components to be mounted in a case are formed of a transparent material for making a mounting area transparent.

Another object of the present invention is to provide a mobile terminal which can produce various light emission patterns according to particular scenarios by using a transparent portion region.

Technical Solution

To achieve these objects and other advantages and in accordance with the purpose of the invention, as embodied and broadly described herein, a mobile terminal includes a case having a transparent portion and a bezel portion, a display arranged in the case, an antenna disposed in the transparent portion of the case which has a transparent sheet and an antenna pattern formed on the transparent sheet, and a controller connected to the antenna pattern electrically.

The case includes a first body having the display and the controller disposed therein, and a second body having the antenna disposed therein, wherein the second body is formed of a transparent material having a transmissivity higher than 50%.

The first body and the second body respectively have a hook portion and a holding portion formed thereon for coupling the first body and the second body together, wherein the hook portion has a first electrode portion for electric connection to the controller and the antenna, and the holding portion has a second electrode portion connected to the first electrode portion, electrically.

The first body and the second body respectively have a hook portion and a holding portion formed thereon for coupling the first body and the second body together, and the controller and the antenna is connected with a flexible printed circuit board.

In this instance, the hook portion and the holding portion are positioned in the bezel portion of the first body in a state the hook portion and the holding portion are coupled with each other.

The mobile terminal further includes a speaker disposed in the second body of the case, wherein the speaker is formed of a transparent material having a transmissivity higher than 50%.

The mobile terminal further includes a microphone disposed in the transparent portion of the case, wherein the microphone is formed of a transparent material having a transmissivity higher than 50%.

The case has a front case having has a front case and a rear case couples to the front case, the front case and the rear case have the transparent portion and the bezel portion, respectively, wherein the transparent sheet of the antenna can be attached to an at least one inside surface of the transparent portion of the front case and the transparent portion of the rear case.

The antenna pattern includes a transparent pattern arranged at the transparent portion f the case, and a non-transparent pattern arranged at the bezel portion of the case, wherein the non-transparent pattern is formed within a range of $1/10\lambda$ from a feed portion or ground portion connected to the controller.

In another aspect of the present invention, a mobile terminal includes a case having a transparent portion and a bezel portion, a display arranged in the case, an antenna disposed in the transparent portion of the case which has a transparent sheet and an antenna pattern formed on the transparent sheet, a controller connected to the antenna pattern electrically, and at least one light source connected to the controller electrically for directing a light to an inside of the transparent sheet of the antenna.

The light source has one end fixed to a flexible printed circuit board connected to the controller, and the other end fixed to the bezel portion of the case, wherein a light emitted from the light source pass through the transparent antenna pattern to an outside of the mobile terminal.

A plurality of the light sources are provided to have the same colors or colors different from one another, and the controller lights or flashes the light sources in succession, or at a time, or controls light emission intensity of the light sources, an order, or time periods of lighting of the light sources, and intensity, an order or time periods of flashing of the light sources.

The controller lights or flashes the light sources in succession, or at a time, or controls light emission intensity of the light sources, an order, or time periods of lighting of the light sources, and intensity, an order or time periods of flashing of the light sources in response to a transmitted/received call, or a message transmission signal.

The case or the display has a user input portion provided thereto for controlling operation of the mobile terminal, and the controller lights or flashes the light sources in succession, or at a time, or controls light emission intensity of the light sources, an order, or time periods of lighting of the light sources, and intensity, an order or time periods of flashing of the light sources in response to a signal from the user input portion.

The case has a Haptic module for generating a touch feedback, and the controller lights or flashes the light sources in succession, or at a time, or controls light emission intensity of the light sources, an order, or time periods of lighting of the light sources, and intensity, an order or time periods of flashing of the light sources in response to a signal from the Haptic module.

The case has an audio output module provided therein, and the controller lights or flashes the light sources in succession, or at a time, or controls light emission intensity of the light sources, an order, or time periods of lighting of the light sources, and intensity, an order or time periods of flashing of the light sources in response to a signal from the audio output module.

The case includes a first body having the display and the controller disposed therein, and a second body having the antenna disposed therein, wherein the second body is formed of a transparent material having a transmissivity higher than 50%.

The case has a front case having has a front case and a rear case couples to the front case, the front case and the rear case have the transparent portion and the bezel portion, respectively, wherein the transparent sheet of the antenna can be attached to an at least one inside surface of the transparent portion of the front case and the transparent portion of the rear case.

Advantageous Effects

The present invention has following advantageous effects.

The mobile terminal related to at least one of the embodiments of the present invention can enlarge the transparent portion region and increase design freedoms.

The mobile terminal related to at least one of the embodiments of the present invention can provide a transparent mounting region by forming various electronic components of a transparent material.

The mobile terminal related to at least one of the embodiments of the present invention can produce a variety of light emission patterns in a particular scenario by using the transparent portion region.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

BEST MODE

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
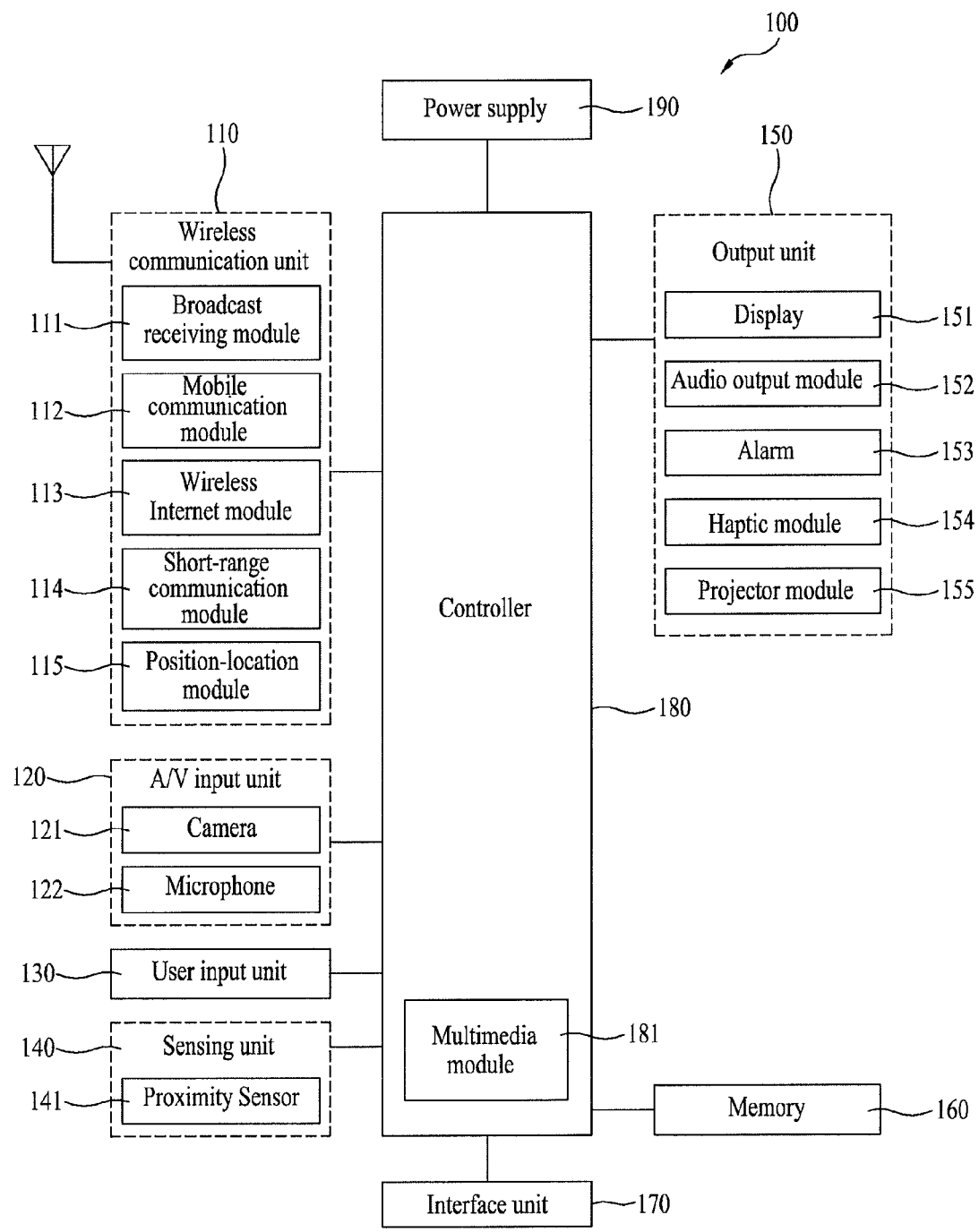
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN)(WI-FI), WIBRO (Wireless broadband), WIMAX (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as BLUETOOTH and ZIGBEE.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
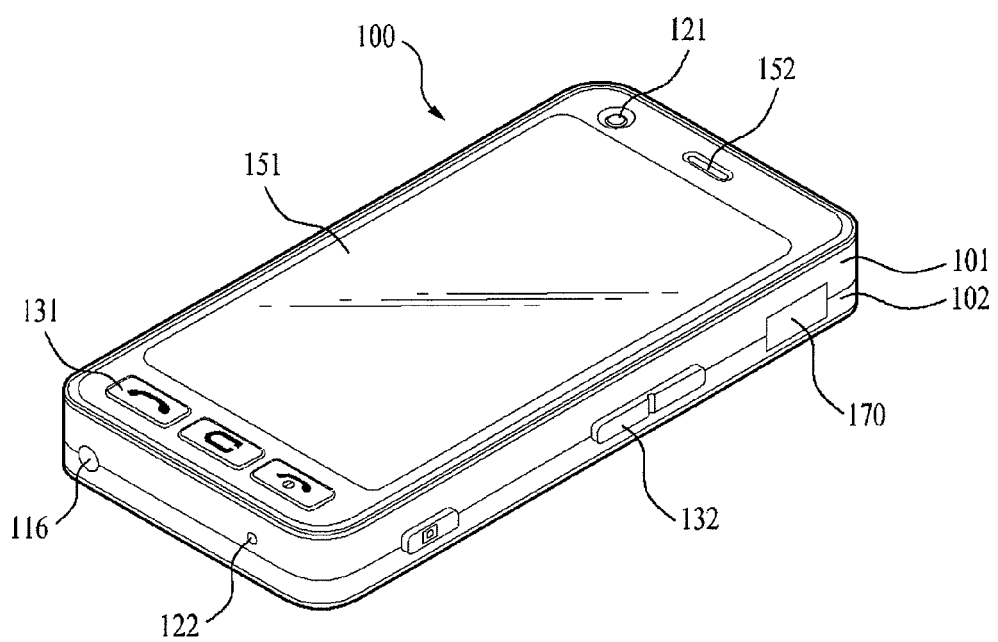
FIG. 2 illustrates a frontal perspective view of a mobile terminal related to a preferred embodiment of the present invention.

FIG. 2 illustrates a frontal perspective view of a mobile terminal related to a preferred embodiment of the present invention.

Referring to FIG. 2, the mobile terminal 100 includes a bar shaped terminal body.

However, the present invention is not limited to this, but is applicable to terminals of various structures, such as a slide types in which two or more than two bodies are coupled so as to be movable to one another relatively, a folder type, a swing type, a swivel type, and so on.

The body includes a case (casing, housing, cover, and so on) which forms an exterior thereof. In the embodiment, the case includes a front case 101 and a rear case 102. Various electronic components are mounted in a space formed between the front case 101 and the rear case 102. There can be at least one intermediate case between the front case 101 and the rear case 102, additionally.

The cases may be injection moldings of synthetic resin or formed of a metal, such as stainless steel or titanium Ti.

The terminal body, mostly the front case 101, may have a display 151, a sound output unit 152, a camera 121, user input units 130/131 and 132, a microphone 122, an interface 170 arranged thereon.

The display 151 occupies most of a main surface of the front case 101. The sound output unit 152 and the camera 121 are arranged at a region adjacent to one end of the display 151 and the user input unit 132 and the microphone 122 are arranged at a region adjacent to the other end of the display 151. The user input unit 132 and the interface 170 may be arranged at sides of the front case 101 and the rear case 102.

The user input unit 130, to be handled for receiving an order to control operation of the mobile terminal 100, may include a plurality of handling units 131 and 132.

The handling units 131 and 132 may be called as a handling portion collectively, which may be of any type as far as it can be handled in a tactile manner.

Contents to be received by the first and second handling units 131 and 132 may be set in a variety of ways. For an example, the first handling unit 131 may receive orders, such as start, end and scroll, and the second handling unit 132 may receive orders such as control of sound volume from the sound output unit 152, and shifting to a touch sensing mode of the display 151, and so on.

Figure 3:
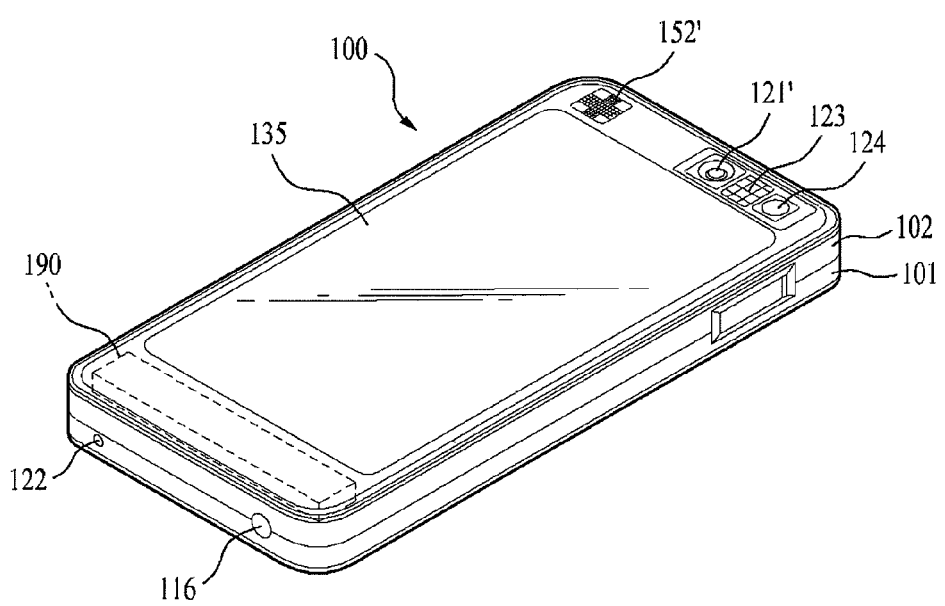
FIG. 3 illustrates a backside perspective view of a mobile terminal related to a preferred embodiment of the present invention.

FIG. 3 illustrates a backside perspective view of a mobile terminal shown in FIG. 2.

Referring to FIG. 3, a camera 121' may be mounted to a backside of the terminal body, i.e., on the rear case 102, additionally. The camera 121' has a picture taking direction opposite to the camera 121 (See FIG. 2) actually, and may be a camera having pixels different from the camera 121.

For an example, it is preferable that the camera 121 has low density of pixels such that taking and transmitting a picture of a face of the user to an opposite side can be done properly, and the camera 121' has high density of pixels since there are many cases when the camera 121' takes a general object and stores the picture without transmission directly. The cameras 121 and 121' may be mounted to the terminal body rotatably or able to pop-up.

A flash 123 and a mirror 124 are arranged adjacent to the camera 121', additionally. The flash 123 illuminates the object when the camera 121' takes the object. The mirror 124 enables the user to see the user's face or so on if the user intends to take a picture of the user with the user's camera 121'.

A sound output unit 152' may be mounted to the backside of the terminal body, additionally. The sound output unit 152' can implement a stereo function together with the sound output unit 152 (See FIG. 2A), and may be used for implementing a speaker phone mode.

Besides an antenna for communication, the terminal body at a side thereof may have a broadcasting signal reception antenna 124, additionally. The antenna 124 in the broadcast receiving module 111 (See FIG. 1) may be mounted to be able to pull out of the terminal body.

The terminal body has a feed portion 190 mounted thereto for supplying power to the mobile terminal 100. The feed portion 190 may be built-in the terminal body or detachably mounted to an outside of the terminal body.

The rear case 102 may have a touch pad 135 mounted thereto additionally for sensing a touch thereto. Alike the display 151, the touch pad 135 may also be a light transmission type. In this case, if the display is configured to provide visual information from opposite sides of the display 151, it becomes that the visual information can be sensed by the touch pad 135. all of the information from opposite sides can be controlled by the touch pad 135. Different from this, a display may be mounted to the touch pad 135 additionally for arranging a touch screen even on the rear case 102.

The touch pad 135 is operative in relation to the display 151 on the front case 101. The touch pad 135 can be arranged in rear of the display 151 in parallel thereto. The touch pad 135 may have a size the same or smaller than the display 151.

The mobile terminal 100 has been reviewed in view of elements and arrangement of the elements related to functions thereof. The mobile terminal related to the present invention will be reviewed further in view of outside elements thereof with reference to FIGS. 4 and 5.

For convenience's sake, of various types of mobile terminals, such as folder type, bar type, swing type, slider type, and so on, the present invention will be described taking a bar type mobile terminal which has a front touch screen as an example. However, the present invention is not limited to the bar type mobile terminal, but is applicable to all types of mobile terminals including the foregoing types. Identical or similar parts with parts described with reference to FIGS. 1 to 3 will be given the same or similar reference symbols, and repetitive description of which will be omitted.

Figure 4:
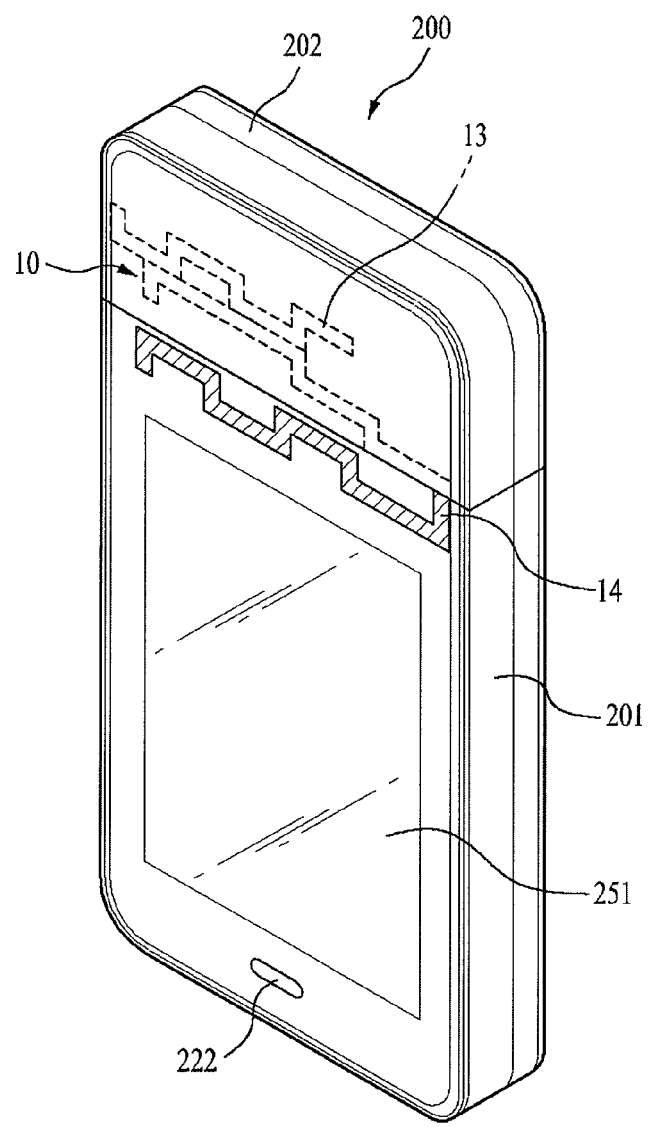
FIGS. 4 and 5 illustrate perspective views each showing key parts of a mobile terminal related to a first preferred embodiment of the present invention.
Figure 5:
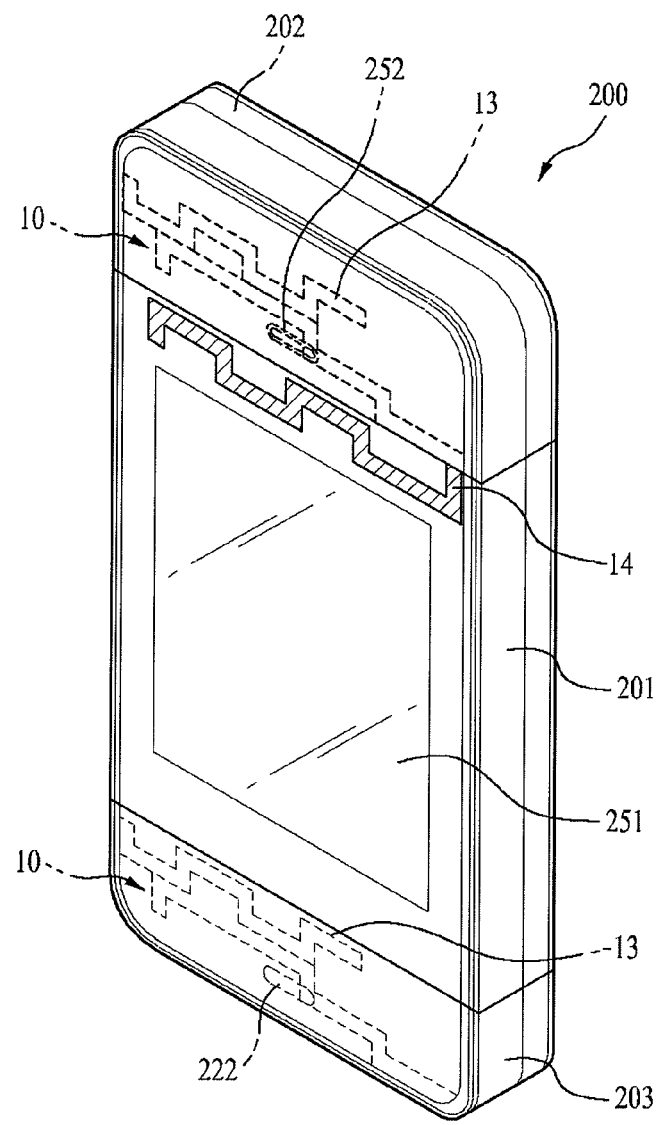
Figure 6:
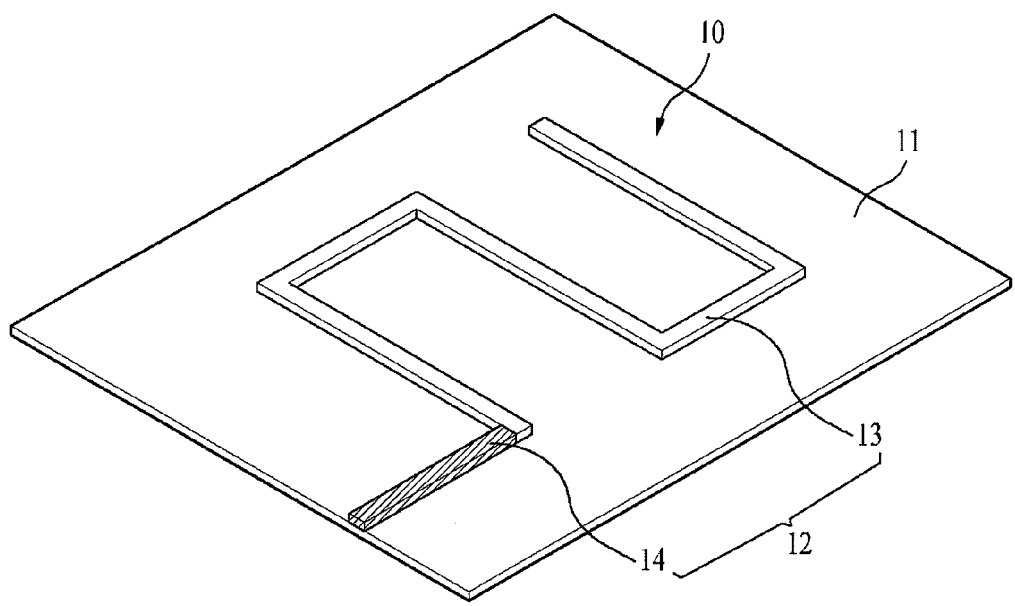
FIG. 6 illustrates a perspective view of key parts of the antenna of a mobile terminal shown in FIG. 4 or 5.

FIGS. 4 and 5 illustrate perspective views each showing key parts of a mobile terminal 200 related to a first preferred embodiment of the present invention, and FIG. 6 illustrates a perspective view of key parts of the antenna 10 of a mobile terminal 200 shown in FIG. 4 or 5.

A mobile terminal 200 related to a first embodiment of the present invention includes a case having a transparent portion 202 and a bezel portion 201, a display 251 in the case, an antenna 10 and a controller (not shown) connected to the antenna 10, electrically.

The antenna 10 disposed in the transparent portion 202 of the case has a transparent sheet 11 and an antenna pattern 12 formed on the transparent sheet 11, and the controller is connected to the antenna pattern 11 electrically.

Referring to FIGS. 4 and 6, the transparent sheet 11 may be formed of a transparent film of polyethylene terephthalate resin PET, or polyether sulfone PES resin, and has an adhesive layer formed on a back side of a surface thereof having the antenna pattern 12 formed thereon for adhesion to an inside of the case.

Referring to FIG. 4, the antenna pattern 12 includes a transparent pattern 13 arranged at the transparent portion 202, and a non-transparent pattern 14 arranged at the bezel portion 202 of the case, wherein the transparent pattern 13 can be formed of a transparent material having good transmissivity and low resistance and good bending characteristic at a room temperature, at least one selected from a group including carbon nano-tube CNT, ITO (Indium-Tin-Oxide), IZO (Indium-Zinc-Oxide) and IZTO/Ag/IZTO (a multi-layered transparent electrode).

Moreover, the non-transparent pattern 14 can be formed within a range of $1/10\lambda$ from a feed portion or ground portion connected to the controller. wherein the feed portion is a region at which the antenna pattern 12 is electrically connected to the controller (for an example, a main PCB) mounted in the mobile terminal for providing a signal to the antenna pattern 12, and the ground portion is a region at which the antenna pattern is connected to a ground surface formed at the main PCB or connected to a ground surface formed in the case separately for grounding a current of the antenna pattern 12.

The antenna pattern 12 has the non-transparent pattern 14 provided partly for forming a portion having the most intensive current (for an example, the feed portion and the ground portion) at which most of ohmic loss takes place of a good conductive material, for an example, copper, nickel, gold, or silver, to reduce the ohmic loss significantly, thereby improving a performance of the antenna 10. Since the range of $1/10\lambda$, from the feed portion or the ground portion is the most intensive current region, it is preferable that the region is formed of a non-transparent pattern.

Referring to FIGS. 4 and 6, the antenna pattern 12 may have a meander line having horizontal runs and vertical connections formed in succession for prolonging an antenna effective length within a small space, and a transparent protective film (not shown) formed on a surface of the antenna pattern 12 for preventing the antenna pattern 12 from damaging.

Moreover, within a range of band of 13.56 MHz to 3000 MHz, more than one antenna pattern can be provided on the same plane for a plurality of application bands (RFID, GPS, or so on) or one application band.

Referring to FIG. 4, the case may have the transparent portion and the bezel portion. In detail, the case may have a first body 210 having the display 251 and the controller disposed therein, and a second body 202 having the antenna 10 disposed therein, wherein the second body 202 may be formed of a transparent material having transmissivity higher than 50%.

The first body 201 may have the transparent portion and the bezel portion, wherein the transparent portion and the bezel portion can be formed at various regions selectively taking design into account, for an example, the bezel portion may be formed at the display 251 and a region about 5 mm from edges of the display, various electronic components (for an example, the controller) may be mounted within the bezel portion, and the transparent portion may be formed at rest of above regions.

Moreover, since the user is liable to recognize the second body being not the transparent portion if transmissivity of the second body is below 50%, if the transmissivity is higher than 50%, the transmissivity may be higher than 70% or 80% taking a design into account.

The transparent portion at the first and second bodies 201 and 202 may be formed of transparent resin or an optical material which have high transmissivity, but not limited thereto, and may be formed of at least one selected from a group including polycarbonate PC resin, polymethyl methacrylate PMMA resin, and CR-39 which is an optical material.

The mobile terminal 200 related to a first preferred embodiment of the present invention may further include a speaker 252 of a transparent material having transmissivity higher than 50% arranged in the second body 202 of the case.

In this instance, the speaker 252 may be a flexible speaker including first and second electric conductive membranes arranged on upper and lower sides, and an insulating layer arranged between the electric conductive membranes, for generating a sound upon application of an electric signal to the electric conductive membranes respectively for making a stacked structure to vibrate.

Moreover, the mobile terminal 200 may further include a microphone 222 formed of a transparent material having transmissivity higher than 50%, the microphone may be arranged in the transparent portion of the case.

Referring to FIG. 5, the case may have a first body 210 having a display 251 and a controller arranged thereon, a second body having an antenna 10 and a transparent speaker 252 arranged thereon, and a third body 203 having an antenna 10, a transparent microphone 222 arranged thereon.

Thus, taking convenience of the user into account, the transparent speaker 252 can be positioned on an upper side of the display 251, and the transparent microphone 222 can be positioned at a lower side of the display 251, the antenna 10 can be positioned at the upper side and a lower side of the display 251 for enhancing efficiency thereof, and in the transparent portion of the first body 201, too.

Thus, since the mobile terminal 200 of the present invention has an enlarged transparent portion of the case, and major electronic components (antenna, speaker, and microphones) formed of transparent material, design freedom can be increased.

Figure 7:
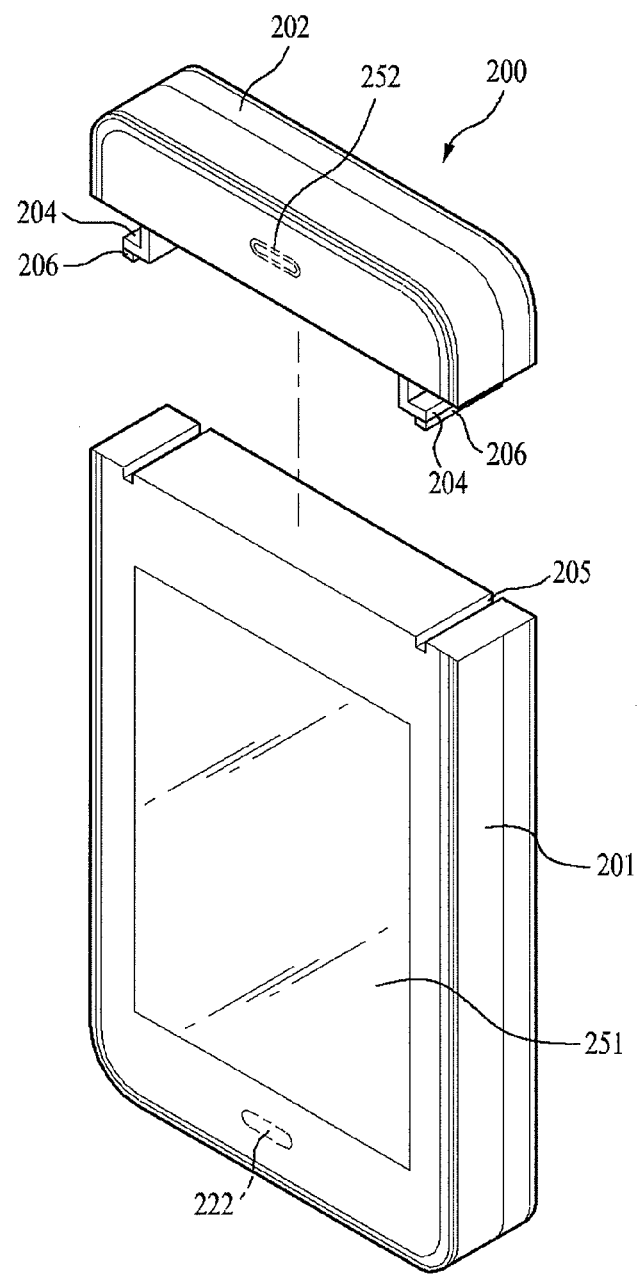
FIGS. 7 and 8 illustrate perspective views of key parts each showing a coupling structure of a mobile terminal related to a first embodiment of the present invention.
Figure 8:
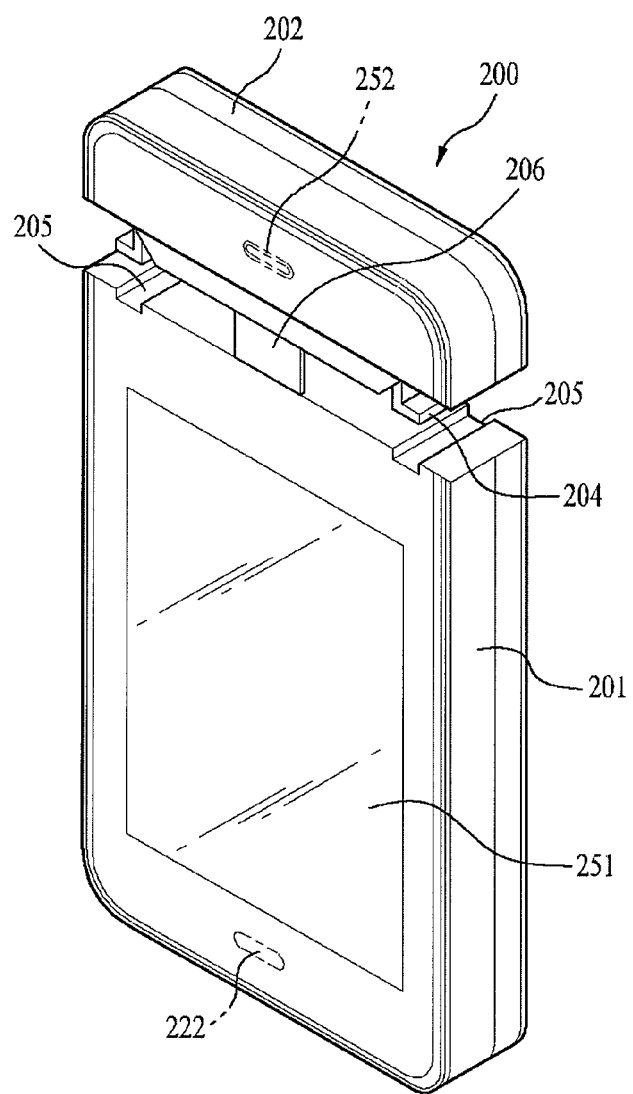

FIGS. 7 and 8 illustrate perspective views of key parts each showing a coupling structure of a mobile terminal related to a first embodiment of the present invention, wherein the case will be described taking a case in which the case has a first body 201 having a display 251 arranged thereon, and a second body 202 having a transparent speaker and an antenna arranged thereon as an example.

At the first body 201 and the second body 202, there may be hook portions and holding portions respectively for fastening the first and second bodies 210 and 202 together. That is, as shown in FIGS. 7 and 8, the first body 201 has the holding portions 205 formed therein, and the second body 202 has the hook portions 204 formed thereon for fastening the second body 202 to the holding portion, or different from this, the first body 201 may have the hook portions (not shown) formed thereon and the second body 202 may have the holding portion (not shown) formed therein for fastening the hook portion.

In this instance, it is preferable that the hook portions 204 and the holding portions 205 are positioned inside of the bezel portion of the first body 210 in a state the first body 201 is fastened to the second body 202, and not exposed to an outside of the terminal.

There may be a various methods of electric connection between the antenna pattern at the second body 202 and the controller positioned at the first body 210.

As one of variations, referring to FIG. 7, the first body 201 has a first electrode portion (not shown) formed at the holding portion, the second body 201 has a second electrode portion 206 formed thereon for electric connection to the first electrode portion, and the first electrode portion may be electrically connected to the controller.

Therefore, the antenna pattern and the controller can be connected electrically as the first electrode portion of the first body 210 is brought into contact with the second electrode portion 206 of the second body 202 in a state the first body 201 is fastened to the second body 202, and the first electrode portion and the second electrode portion 206 may be connected with a connecting pin or the like.

Different from this, referring to FIG. 7, the controller at the first body 201 and the antenna pattern of the second body 202 may be connected with a flexible printed circuit board 206.

Or, the antenna 10 and the controller may be in direct contact electrically for power supply, or the antenna 10 and the controller may be spaced with a gap below 0.01× with reference to a free space wavelength for indirect power supply by using electromagnetism.

Though a case in which the first body 201 and the second body 202 of the case are separated, the present invention is not limited to this, but the case may have the first body 201 and the second body 202 formed as one unit.

For an example, as described with reference to FIGS. 2 and 3, the case may have a front case and a rear case.

That is, the case has a front case and a rear case coupled to the front case, the front case and the rear case have the transparent portion and the bezel portion, respectively, the transparent sheet of the antenna can be attached to an at least one inside surface of the transparent portion of the front case and the transparent portion of the rear case.

The transparent portion and the bezel portion can be formed at the front case and the rear case selectively taking a design into account. For an example, the bezel portion may be formed at the display 251 and a region about 5 mm from edges of the display 251 for mounting various electronic components (for an example, the controller) therein.

Moreover, other regions may be formed as the transparent portion, for mounting the antenna, the speaker and the microphone thereto.

A mobile terminal related to a second embodiment of the present invention will be described with reference to the attached drawings, in detail.

Figure 9:
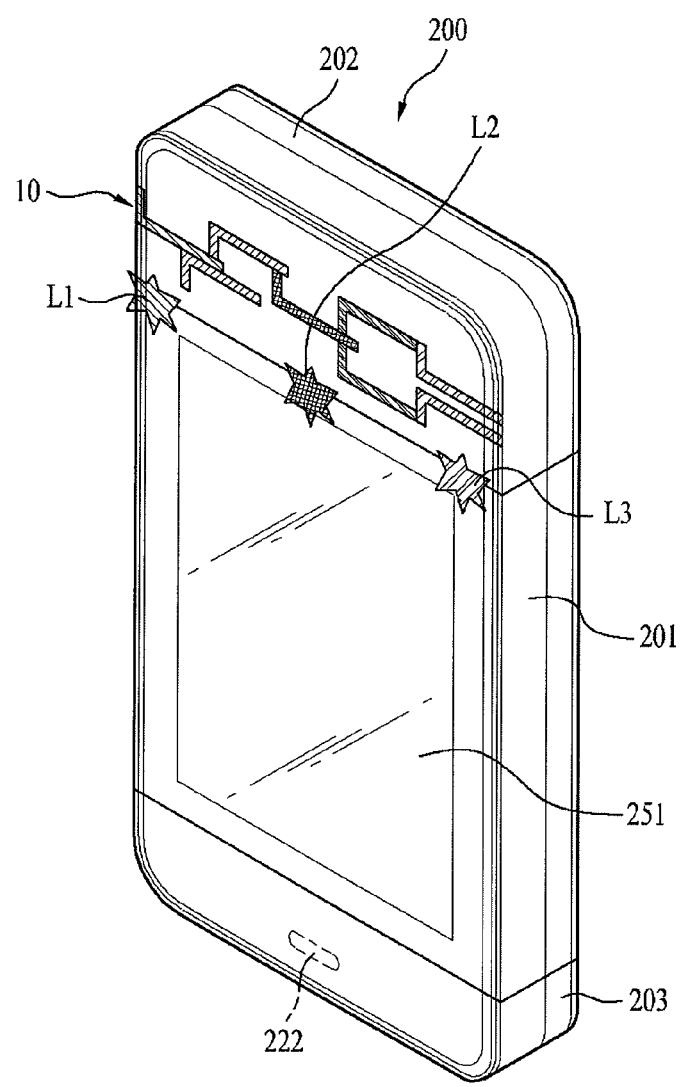
FIG. 9 illustrates a perspective view of key parts of a mobile terminal related to a second preferred embodiment of the present invention.
Figure 10:
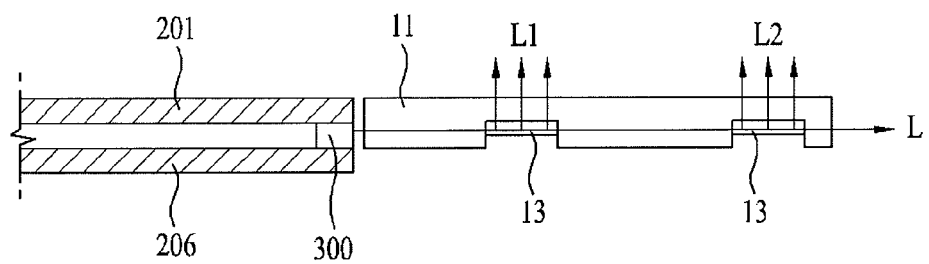
FIG. 10 illustrates a section of key parts of a mobile terminal shown in FIG. 9.

FIG. 9 illustrates a perspective view of key parts of a mobile terminal related to a second preferred embodiment of the present invention, FIG. 10 illustrates a section of key parts of a mobile terminal shown in FIG. 9, and FIGS. 11A~11C illustrate conceptual drawings each for describing a light emission pattern of a mobile terminal related to the present invention.

The mobile terminal 200 related to a second preferred embodiment of the present invention includes a case 202, 201 having a transparent portion and a bezel portion, a display 251 in the case, and an antenna 10 and controller (not shown) connected to the antenna 10, electrically.

The antenna 10 is disposed in the transparent portion of the case, the antenna includes a transparent sheet 11 and an antenna pattern 12 formed on the transparent sheet 11.

The mobile terminal 200 also includes at least one light source 300 connected to the controller for directing a light to an inside of the transparent sheet 11.

That is, though the case, the display, the controller and the antenna of the mobile terminal of the second embodiment of the present invention has the same structures and connections with the case, the display, the controller and the antenna of the mobile terminal of the first embodiment of the present invention, the mobile terminal 200 of the second embodiment of the present invention includes at least one light source, additionally.

Referring to FIGS. 9 and 10, the light source 300 may be one of a variety of light emission devices having a small size, low power consumption, and good light emission efficiency, for an example, LED.

The light source 300 may have one end fixed to a flexible printed circuit board 206 (See FIG. 8) connected to the controller, and the other end fixed to the bezel portion of the case, for an example, in the first body 201, such that the light L incident on the transparent sheet 11 from the light source 300 may emit to an outside of the terminal through light emission portions L1 to L3 provided at a passage of the antenna pattern 13.

That is, by positioning the light source 300 between the flexible printed circuit board 206 and the bezel portion of the case, leakage of the light can be cut off, such that the light transmits through the transparent sheet 11 to expose the light from a portion having the antenna pattern 13 formed thereon.

In the meantime, the antenna pattern 13 may be carved in relief or engraved in intaglio on the transparent sheet 11.

As described before, since the antenna pattern 13 can be formed on the transparent sheet 11 to have various passages, permitting to form a position of the light emission portion along the antenna pattern 13 in a variety of manners on the case taking a design into account, the mobile terminal related to the embodiment of the present invention can provide various light emission patterns.

Moreover, the mobile terminal 200 may have, not only the positions of the light emission portions L2~L3, but also a number, a size and a shape of the light emission portions formed, freely.

Furthermore, a plurality of the light sources can be provided to have a number the same with a number of the light emission portions L1 to L3, having the same colors or colors different from one another, and the controller can light or flash the light sources in succession, or at a time, or can control light emission intensity of the light sources (a gradation effect), an order, or time periods of lighting of the light sources, and intensity, an order or time periods of flashing of the light sources for providing a variety of light emission patterns in a particular scenario (a call, a message service, or so on).

Figure 11:
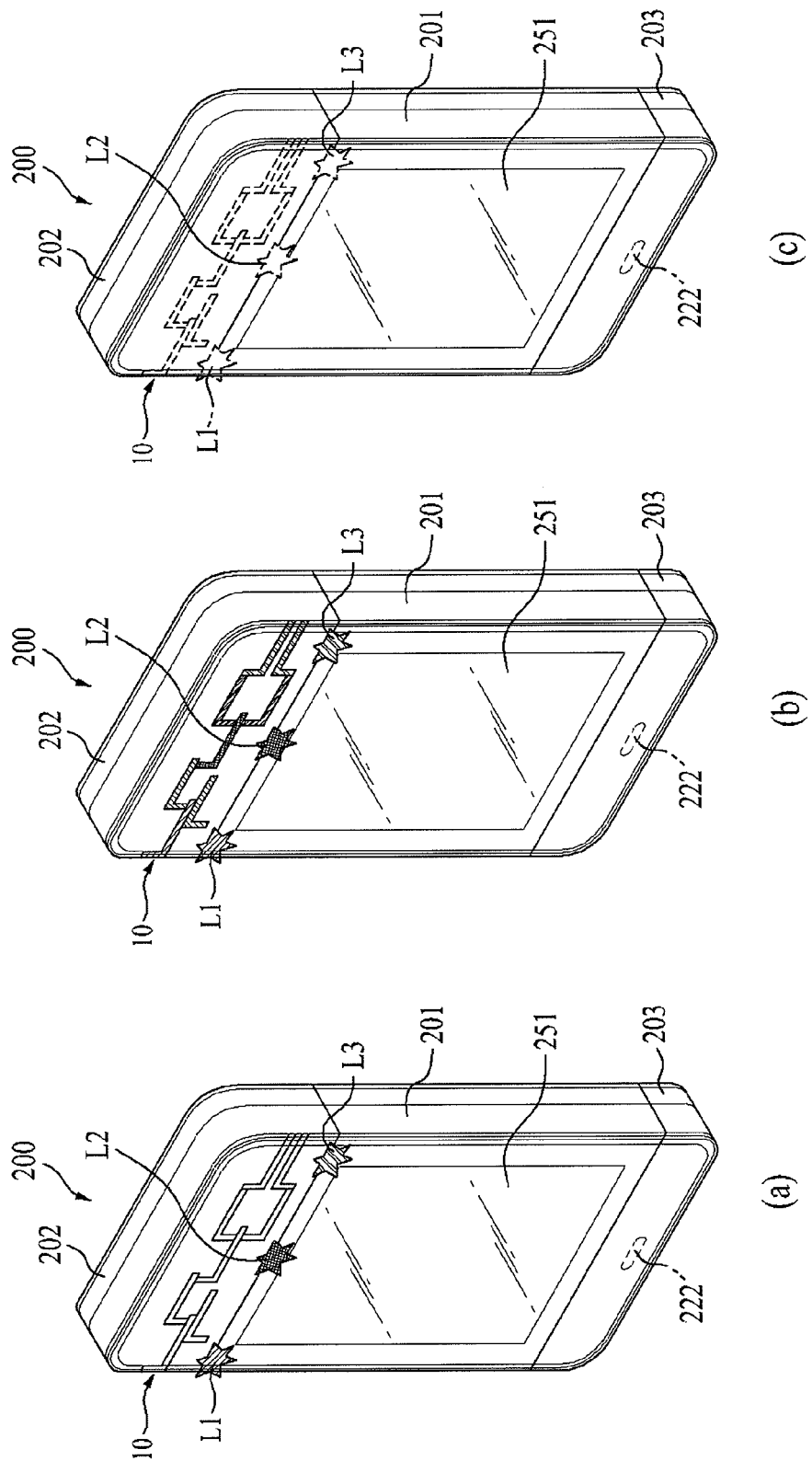
FIGS. 11A~11C illustrate conceptual drawings each for describing a light emission pattern of a mobile terminal related to the present invention.

Referring to FIG. 11A, in a mobile terminal related to the present invention, an order, time periods, or intensity of the light sources can be controlled different from one another to provide light emission patterns, as shown in FIG. 11B, colors of the light sources may be made different to provide light emission patterns, and as shown in FIG. 11C, an order of flashing, time periods of flashing, or intensity of flashing may be controller to provide light emission patterns.

A method for applying the variety of light emission patterns described above to a particular scenario of the mobile terminal 200 will be described with reference to the attached drawings.

FIGS. 12 to 15 illustrate front views each for describing one operation state of a mobile terminal related to the present invention.

Figure 12:
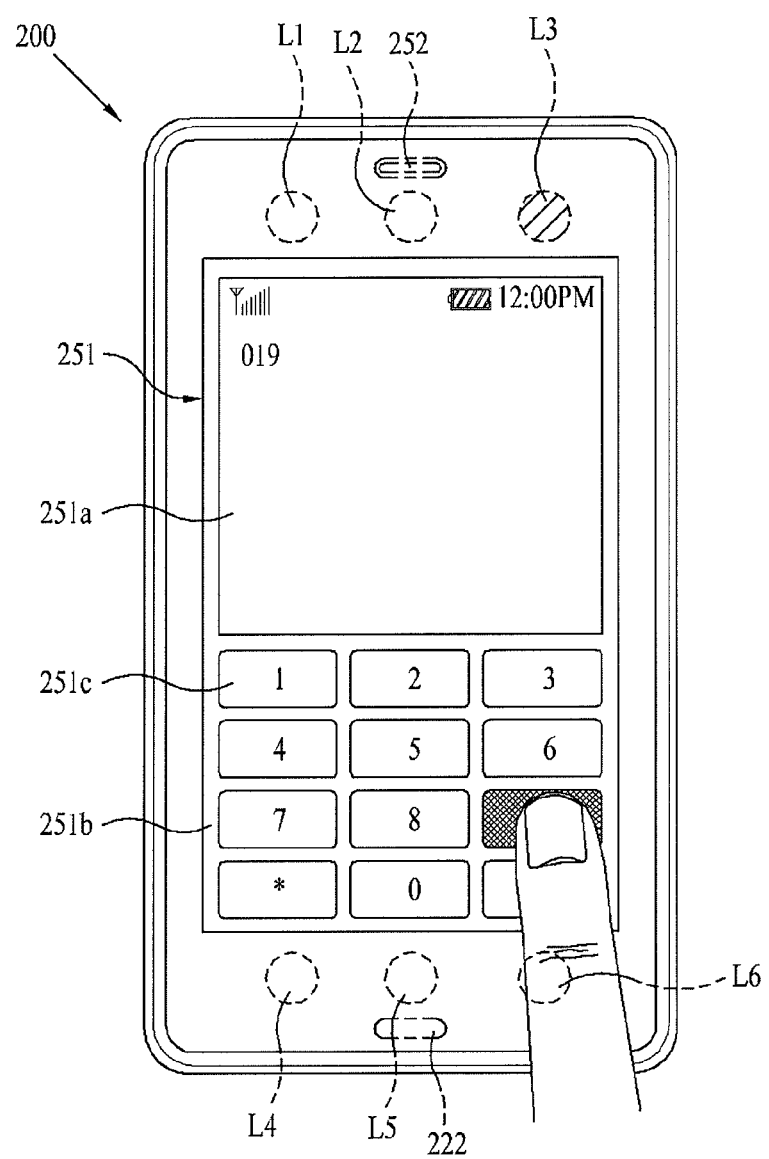
FIGS. 12 to 15 illustrate front views each for describing one operation state of a mobile terminal related to the present invention.

Referring to FIG. 12, various kinds of visual information can be displayed on the display 251. The information can be displayed in forms of characters, numerals, codes, graphics or icons.

In order to input such information, at least one of characters, numerals, codes, graphics and icons are displayed in a regular arrangement to form a key pad. The key pad may be called as 'a soft key'.

Figure 13:
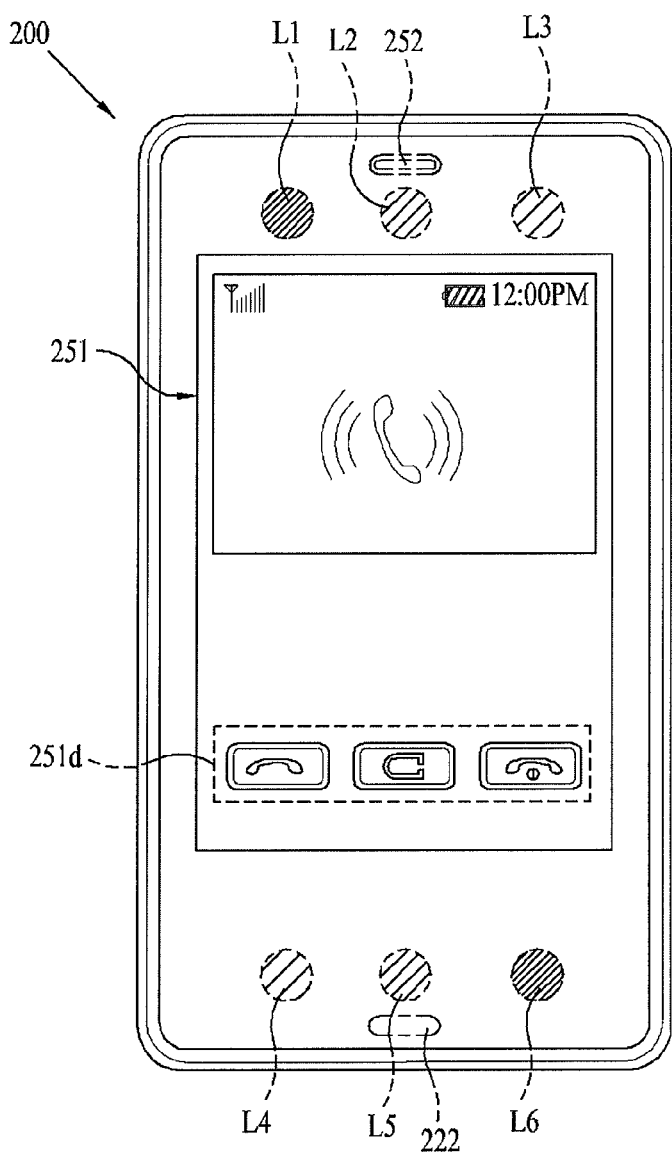
Figure 14:
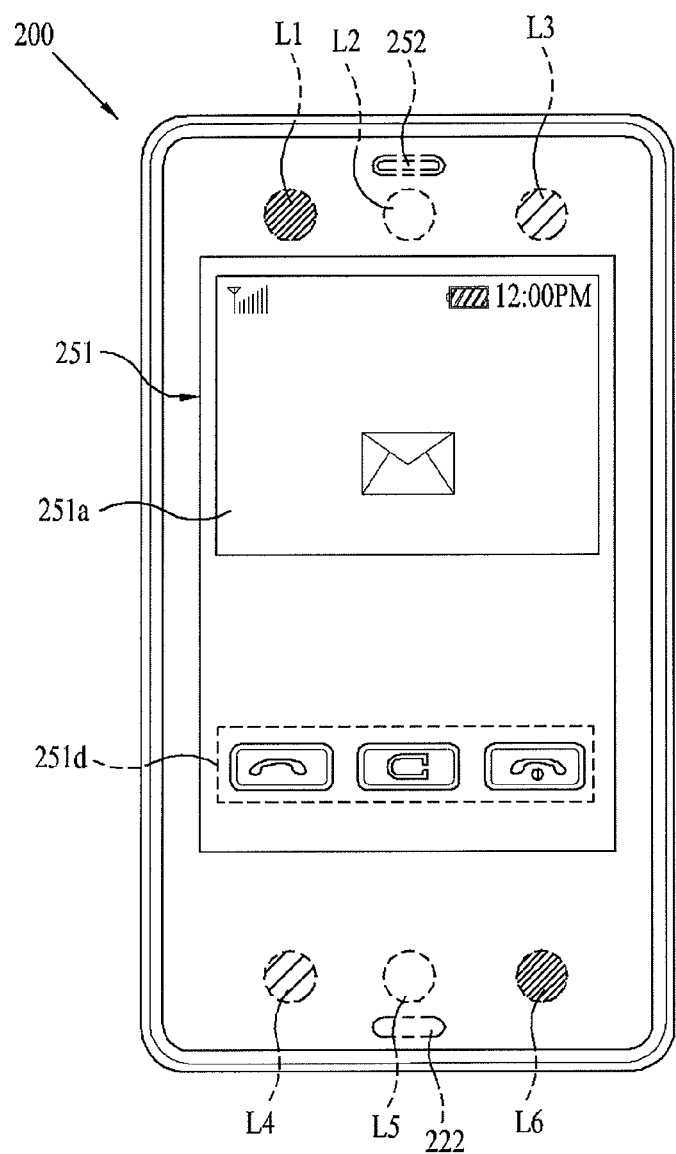

FIGS. 12 to 14 illustrate plan views each showing a touch application to the soft key at a front of the case of the mobile terminal.

The display 251 can be put into operation wholly, or divided into a plurality of regions. In a latter case, it can be made that the plurality of regions are operable in relation to one another.

For an example, referring to FIG. 12, on an upper side and a lower side of the display 251, an output window 251a and an input window 251b are displayed, respectively. The input window 251b has a first soft key 251c having numerals displayed thereon for application of telephone numbers and so on thereto.

If the first soft key 251c is touched, numerals or the like corresponding to the first soft key touched thus is displayed on the output window 251a.

Figure 15:
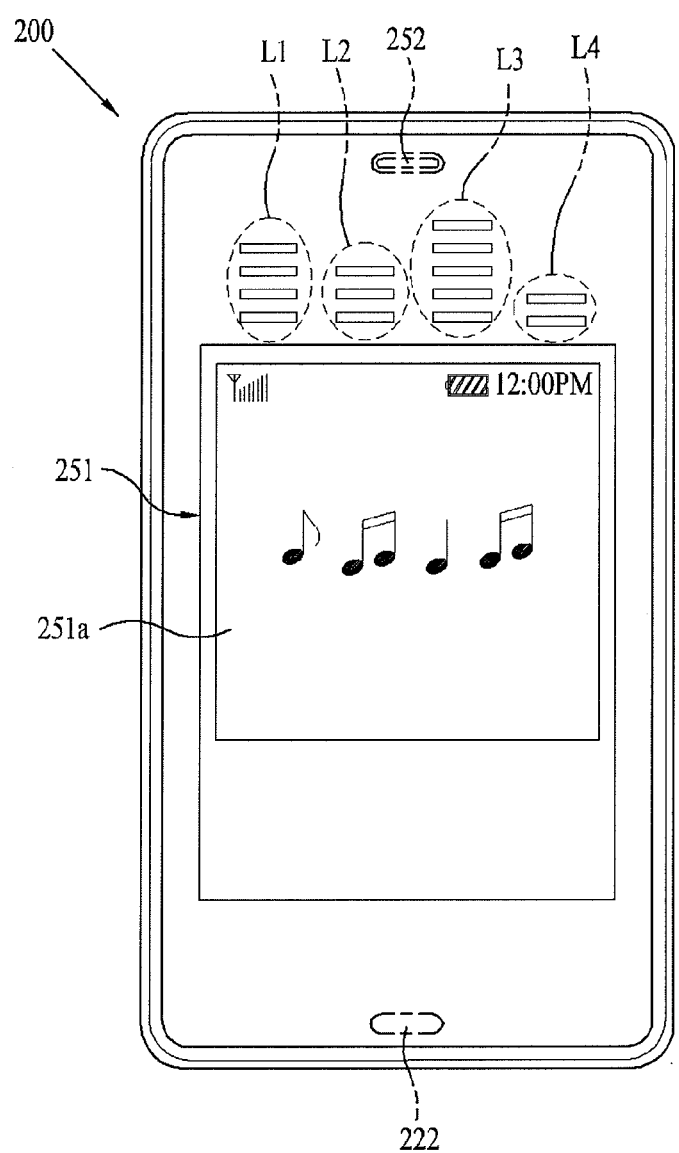

Different from this, referring to FIGS. 13 and 14, the display 251 may have the output window 251 and the input window separated from each other, a key formed thereon for a particular scenario in addition to the numeral keys, and a second soft key 251d formed thereon for displaying a character or a design for confirmation or erasure. Or, as shown in FIG. 15, the display 251 may only have the output window 251a.

Referring to FIG. 12, the mobile terminal related to the embodiment may have a user input portion 251b formed at the case or the display for controlling operation of the mobile terminal, and the controller can light or flash the light sources in succession, or at a time, or can control light emission intensity of the light sources, an order, or time periods of lighting of the light sources, and intensity, an order or time periods of flashing of the light sources in response to a signal applied to the user input portion 251b.

That is, if input of a particular numeral key, or a character key, is made by a method, such as a touch, not only the numeral or the character corresponding to the numeral key or the character key touched thus can be displayed on the output window 251a, but also the light emission patterns corresponding to the numeral key or the character key can be produced.

Moreover, referring to FIGS. 13 and 14, since the controller can light or flash the light sources in succession, or at a time, or can control light emission intensity of the light sources, an order, or time periods of lighting of the light sources, and intensity, an order or time periods of flashing of the light sources in response to a transmitted/received signal or a message transmission signal, the controller can produce a variety of light emission patterns by using the plurality of light emission portions L1~L3.

In this instance, the call transmission signal may include all of particular signals, such as signal transmission, signal transmission standby, signal reception, get through and so on, and the controller can produce light emission patterns different from one another for each of the scenario.

For an example, in a case of the signal transmission standby, light emission or flashing may be repeated in association with the signal transmission signal sound until an opposite person takes the call, or in a state the call is taken, colors (for an example, heavier colors as the time passes) different from one another may be emitted, or flashing may be made whenever a communication time period passes fixed intervals.

Moreover, the message transmission signal may include all of particular scenarios, such as a message transmission and reception and so on, and the controller can produce the light emission patterns different from one another for each of the scenarios.

For an example, lights of colors different from one another may be emitted according to receivers, or a light emission speed or a light flashing speed may be varied depending on urgency even for providing a visual effect to the user.

Referring to FIG. 15, the mobile terminal has an audio output module provided in the case, and the controller can light or flash the light sources in succession, or at a time, or can control light emission intensity of the light sources, an order, or time periods of lighting of the light sources, and intensity, an order or time periods of flashing of the light sources in response to a signal from the Audio output module.

For an example, an equalizer effect can be produced by using the plurality of light emission portions L1~L4 during music is reproduced.

Moreover, in the standby mode, light emission or flashing may be repeated for a fixed time period or at times, or the light emission or the flashing intensity may be controlled to provide a gradation effect, or the plurality of light emission portions may be used for displaying a remained battery charge amount, or the light source may be made to emit a light or to flash the light at a fast speed for informing the a remained battery charge amount, visually.

The configurations and methods described above is applicable to the mobile terminal, not with limitations, but all or some of the embodiments may be combined selectively for making various variations available.

The configurations and methods described above is applicable to the mobile terminal having the proximity sensor provided thereto, not with limitations, but all or some of the embodiments may be combined selectively for making various variations available.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

The invention claimed is:

1. A mobile terminal comprising:
a front case having a first portion of a transparent portion and a first portion of an opaque bezel portion;
a rear case coupled to the front case and having a second portion of the transparent portion and a second portion of the opaque bezel portion;
a display located in the bezel portion;
an antenna including a transparent pattern arranged at the transparent portion and a non-transparent pattern arranged at the opaque bezel portion; and
a controller operatively connected to the transparent antenna pattern and the non-transparent pattern.

2. The mobile terminal of claim 1, further comprising a microphone located in the transparent portion of the case, the microphone being formed of a transparent material having a transmissivity higher than 50%.

3. The mobile terminal of claim 1, wherein the non-transparent pattern is formed within a range of $1/10\lambda$ from one of a feed portion and a ground portion connected to the controller.

4. A mobile terminal comprising:
a case having a transparent portion and an opaque bezel portion;
a display located in the case;
an antenna located in the transparent portion of the case, the antenna having a transparent sheet and a transparent antenna pattern carved in relief or engraved in intaglio on the transparent sheet;
a controller operatively connected to the antenna pattern; and
at least one light source located in the opaque bezel portion and connected to the controller, the at least one light source being configured to direct light toward a side of the transparent sheet of the antenna,
wherein the at least one light source has one end fixed to a flexible printed circuit board connected to the controller, and a second end fixed to inside of the opaque bezel portion of the case, and
wherein a light emitted from the light source is transmitted through the transparent sheet and is emitted to the exterior case through emission portions provided at a passage of the transparent antenna pattern.

5. The mobile terminal of claim 4, wherein the at least one light source is a plurality of the light sources, and the controller is configured to control at least one of duration of operation, intensity of light emission, and sequence of operation for each of the plurality of light sources.

6. The mobile terminal of claim 5, wherein the controller is further configured to operate at least one of the light sources in response to at least one of a transmitted call, a received call, and a message transmission signal.

7. The mobile terminal of claim 5, wherein at least one of the case and the display has a user input portion to control operation of the mobile terminal, and the controller is configured to operate at least one of the light sources in response to a signal from the user input portion.

8. The mobile terminal of claim 5, further comprising a haptic module located in the case, the haptic module being configured to generate a touch feedback, wherein the controller is further configured to operate at least one of the light sources in response to a signal from the haptic module.

9. The mobile terminal of claim 5, further comprising an audio output model located in the case, and the controller is configured to operate at least one of the light sources in response to a signal from the audio output module.

10. The mobile terminal of claim 4, wherein the case includes:
a first body having the display and the controller located therein, and
a second body having the antenna located therein, and
wherein the second body is formed of a transparent material having a transmissivity higher than 50%.

11. The mobile terminal of claim 4, wherein the case includes a front case and a rear case coupled to the front case, a first portion of the transparent portion is provided by the front case and a second portion of the transparent portion is provided by the rear case, and the bezel is provided by the rear case.

12. The mobile terminal of claim 11, wherein the transparent sheet of the antenna is attached to at least one of an inside surface of the first portion of the transparent portion of the front case and an inside surface of the second portion of the transparent portion of the rear case.

13. The mobile terminal of claim 4, further comprising:
a first body having the opaque bezel portion and a holding portion; and
a second body having the transparent portion and a hook portion,
wherein the holding portion and the hook portion are configured to couple the first body to the second body and operatively connect the controller to the antenna, and
wherein the hook portion and the holding portion are located in the opaque bezel portion of the first body when the hook portion is coupled to the holding portion.

14. The mobile terminal of claim 13, further comprising a flexible printed circuit board operatively connecting the controller to the antenna.

* * * * *